United States Patent
Yuan et al.

(10) Patent No.: US 10,116,516 B2
(45) Date of Patent: Oct. 30, 2018

(54) NETWORK TOPOLOGY DISCOVERY METHOD AND DEVICE

(71) Applicant: Huawei Technologies Co., Ltd., Shenzhen (CN)

(72) Inventors: Yulin Yuan, Shenzhen (CN); Xiaoji Fan, Shenzhen (CN); Zhiming Ye, Shenzhen (CN)

(73) Assignee: Huawei Technologies Co., Ltd., Shenzhen (CN)

(*) Notice: Subject to any disclaimer, the term of this patent is extended or adjusted under 35 U.S.C. 154(b) by 65 days.

(21) Appl. No.: 15/429,946

(22) Filed: Feb. 10, 2017

(65) Prior Publication Data
US 2017/0155556 A1    Jun. 1, 2017

Related U.S. Application Data

(63) Continuation of application No. PCT/CN2015/086155, filed on Aug. 5, 2015.

(30) Foreign Application Priority Data

Aug. 12, 2014 (CN) .......................... 2014 1 0395692

(51) Int. Cl.
*H04L 12/24*  (2006.01)
*H04L 12/26*  (2006.01)
*H04L 12/751*  (2013.01)

(52) U.S. Cl.
CPC ............ *H04L 41/12* (2013.01); *H04L 41/142* (2013.01); *H04L 43/08* (2013.01); *H04L 43/16* (2013.01); *H04L 45/02* (2013.01); *Y02D 30/30* (2018.01)

(58) Field of Classification Search
None
See application file for complete search history.

(56) References Cited

U.S. PATENT DOCUMENTS 6,646,989 B1 * 11/2003 Khotimsky ............. H04L 45/12
                                                     370/238
8,443,065 B1 *  5/2013 White ....................... H04L 45/02
                                                     370/254
(Continued)

FOREIGN PATENT DOCUMENTS

CN         1921419 A      2/2007
CN       101640612 A      2/2010
(Continued)

OTHER PUBLICATIONS

Knertser et al., "Network Device Discovery," Degree project in Communication Systems, XP055481084, KTH Information and Communication Technology, Stockholm, Sweden, (Jun. 10, 2013).

*Primary Examiner* — Michael J Moore, Jr.
(74) *Attorney, Agent, or Firm* — Leydig, Voit & Mayer, Ltd.

(57) ABSTRACT

Embodiments of the present application provide a network topology discovery method and device, for performing a comprehensive analysis on results obtained after network topology discovery by using multiple types of network characteristic data, improve accuracy of network topology discovery. A specific solution comprises: collecting network characteristic data of a network element in a network; obtaining at least two corresponding link subsets respectively by using at least two types of topology discovery algorithms and according to the network characteristic data, gathering all links in the link subsets into one set to obtain a first link set, combining same links in the first link set, and for multiple links having only one same port, retaining only a link having a largest confidence value in the multiple links and deleting a remaining link, to obtain a second link set; obtaining a network topology of the network according to the second link set.

17 Claims, 4 Drawing Sheets

(56) References Cited

U.S. PATENT DOCUMENTS

| | | | |
|---|---|---|---|
| 9,705,747 B1* | 7/2017 | Xue | H04L 45/125 |
| 9,749,214 B2* | 8/2017 | Han | H04L 45/02 |
| 2002/0165927 A1 | 11/2002 | Theriault et al. | |
| 2002/0165957 A1 | 11/2002 | Devoe et al. | |
| 2004/0255184 A1* | 12/2004 | Bejerano | H04L 12/462 |
| | | | 714/4.1 |
| 2006/0056328 A1* | 3/2006 | Lehane | H04L 45/02 |
| | | | 370/315 |
| 2006/0256733 A1* | 11/2006 | Bejerano | H04L 12/462 |
| | | | 370/254 |
| 2008/0170513 A1* | 7/2008 | Niranjan | H04L 45/02 |
| | | | 370/256 |
| 2009/0116404 A1 | 5/2009 | Mahop et al. | |
| 2010/0208662 A1* | 8/2010 | Fuste Vilella | H04W 40/00 |
| | | | 370/328 |
| 2011/0317710 A1* | 12/2011 | Tessier | H04L 45/02 |
| | | | 370/401 |
| 2012/0113863 A1* | 5/2012 | Vasseur | H04L 12/12 |
| | | | 370/254 |
| 2012/0131211 A1 | 5/2012 | Schemitsch | |
| 2016/0112324 A1 | 4/2016 | Abbas | |
| 2016/0277279 A1 | 9/2016 | Lin | |
| 2017/0149619 A1* | 5/2017 | Yuan | H04L 41/12 |
| 2017/0155556 A1 | 6/2017 | Yuan et al. | |

FOREIGN PATENT DOCUMENTS

| | | |
|---|---|---|
| CN | 101874388 A | 10/2010 |
| CN | 101917310 A | 12/2010 |
| CN | 103828310 A | 5/2014 |
| CN | 104125154 A | 10/2014 |
| WO | 2009118050 A1 | 10/2009 |

* cited by examiner

NETWORK TOPOLOGY DISCOVERY METHOD AND DEVICE

CROSS-REFERENCE TO RELATED APPLICATIONS

This application is a continuation of International Application No. PCT/CN2015/086155, filed on Aug. 5, 2015, which claims priority to Chinese Patent Application No. 201410395692.4, filed on Aug. 12, 2014. The disclosures of the aforementioned applications are hereby incorporated by reference in their entireties.

TECHNICAL FIELD

Embodiments of the present application relate to the field of network connection detection, and in particular, to a network topology discovery method and device.

BACKGROUND

In a stage of network evaluation and optimization, an operator needs to perform evaluation and optimization on a network and analyze a network element in the network and a service status. For example, the operator needs to collect configuration information of a network element, collect traffic information of a port, evaluate a capacity of the port, discover a port with overloaded traffic, and perform capacity expansion or adjust a flow path for the port. When an optimization and analysis tool is used to perform the network evaluation and optimization, generating a network topology needs to depend on the optimization and analysis tool. Network traffic evaluation, service evaluation, and emulation can be performed only based on the network topology and a result of network evaluation and analysis is displayed based on the network topology.

A network topology discovery method in the prior art is collecting network characteristic data of a network element in a to-be-analyzed network, obtaining, by means of calculation according to the collected network characteristic data and a corresponding network topology discovery algorithm, a link set corresponding to the algorithm, and further obtaining a network topology. For example, a network topology based on a port Internet Protocol (IP) address characteristic is obtained by means of calculation according to a port IP address and an IP address matching algorithm, or a network topology based on a port alias characteristic is obtained by means of calculation according to a port alias and a port alias matching algorithm, or a network topology of a network established based on Cisco devices (only a network established based on Cisco devices is supported) may be obtained according to the Cisco Discovery Protocol (CDP), or the like.

In the prior art, when network topology discovery is performed based on a single type of network characteristic data, if network topology discovery is performed when a to-be-analyzed network does not support this type of network characteristic or a corresponding algorithm, accuracy of network topology discovery is low; or in a case in which network topology discovery is performed when a to-be-analyzed network supports this type of network characteristic or a corresponding algorithm, because data is not completely collected or data is inconsistent, uncertainty exists in a link relationship in the network, and accuracy of network topology discovery is also relatively low. In addition, when network topology discovery is performed by using multiple types of network characteristic data, no comprehensive analysis for improving accuracy of network topology discovery is performed on multiple obtained network topology discovery results.

SUMMARY

Embodiments of the present application provide a network topology discovery method and device, which can perform a comprehensive analysis on results obtained after network topology discovery is performed by using multiple types of network characteristic data, and improve accuracy of network topology discovery.

According to a first aspect, an embodiment of the present application provides a network topology discovery method, where the method includes:

collecting network characteristic data of all network elements in a to-be-analyzed network;

obtaining at least two corresponding link subsets respectively by using at least two types of topology discovery algorithms and according to the network characteristic data, and gathering all links in the at least two link subsets into one set to obtain a first link set, where a confidence value of a link in each link subset is equal to a confidence value of a topology discovery algorithm corresponding to the link subset, confidence values of different topology discovery algorithms are different, and the link is a link that consists of two ports of different network elements;

obtaining a second link set by performing an operation on the first link set, where the operation includes: combining same links, and for at least two links having only one same port, retaining a link having a largest confidence value in the at least two links and deleting a remaining link, where the same links are at least two links in which two ports included in one link are the same as those in any other link; and obtaining a network topology of the to-be-analyzed network according to each link in the second link set.

With reference to the first aspect, in a first possible implementation manner, the combining same links includes:

combining same links in the first link set, and calculating, according to multiple confidence values of the same links and an uncertainty reasoning algorithm, a confidence value of the retained link after combining.

With reference to the first aspect or the first possible implementation manner of the first aspect, in a second possible implementation manner, the operation further includes: after the retaining a link having a largest confidence value in the at least two links and deleting a remaining link, comparing the confidence values of the links in the first link set with a preset threshold, and selecting a link whose confidence value is greater than the preset threshold.

With reference to the first possible implementation manner of the first aspect, in a third possible implementation manner, the uncertainty reasoning algorithm includes the following:

$$CF_{i,j}(H) = \begin{cases} CF_i(H) + CF_j(H) - CF_i(H) \times CF_j(H) & \text{if } CF_i(H) \geq 0, CF_j(H) \geq 0 \\ CF_{i,j}(H) = CF_i(H) + CF_j(H) + \\ CF_i(H) \times CF_j(H) & \text{if } CF_i(H) < 0, CF_j(H) < 0 \\ \dfrac{CF_i(H) + CF_j(H)}{1 - \min(|CF_i(H)|, |CF_j(H)|)} & \text{if } CF_i(H) \text{ and } CF_j(H) \\ & \text{have opposite signs} \end{cases}$$

where $CF_i(H)$ is a confidence value among multiple confidence values of the same links, $CF_j(H)$ is another confidence value among the multiple confidence values of the same links, and $CF_{i,j}(H)$ is a new confidence value of the same links that is calculated according to $CF_i(H)$ and $CF_j(H)$.

With reference to any possible implementation manner of the first aspect to the third possible implementation manner of the first aspect, in a fourth possible implementation manner, the network characteristic data and the corresponding topology discovery algorithm include at least two types of the following combinations: a port Internet Protocol (IP) address and an IP address matching algorithm, a port alias and a port alias matching algorithm, or port Link Layer Discovery Protocol (LLDP) neighbor information and a port LLDP link algorithm.

According to a second aspect, an embodiment of the present application provides a network topology discovery device, where the device includes:

a collection unit, configured to collect network characteristic data of all network elements in a to-be-analyzed network;

a link obtaining unit, configured to obtain at least two corresponding link subsets respectively by using at least two types of topology discovery algorithms and according to the network characteristic data, and gather all links in the at least two link subsets into one set to obtain a first link set, where a confidence value of a link in each link subset is equal to a confidence value of a topology discovery algorithm corresponding to the link subset, confidence values of different topology discovery algorithms are different, and the link is a link that consists of two ports of different network elements;

a link processing unit, configured to obtain a second link set by performing an operation on the first link set, where the operation includes: combining same links, and for at least two links having only one same port, retaining a link having a largest confidence value in the at least two links and deleting a remaining link, where the same links are at least two links in which two ports included in one link are the same as those in any other link; and a topology obtaining unit, configured to obtain a network topology of the to-be-analyzed network according to each link in the second link set.

With reference to the second aspect, in a first possible implementation manner, the link processing unit is specifically configured to:

obtain the second link set by performing an operation on the first link set, where the operation includes: combining same links in the first link set, calculating, according to multiple confidence values of the same links and an uncertainty reasoning algorithm, a confidence value of the retained link after combining, and for the at least two links having only one same port, retaining the link having the largest confidence value in the at least two links and deleting the remaining link, where the same links are at least two links in which two ports included in one link are the same as those in any other link.

With reference to the second aspect, in a second possible implementation manner, the link processing unit is specifically configured to:

obtain the second link set by performing an operation on the first link set, where the operation includes: combining same links in the first link set, calculating, according to multiple confidence values of the same links and an uncertainty reasoning algorithm, a confidence value of the retained link after combining, and for the at least two links having only one same port, retaining the link having the largest confidence value in the at least two links, deleting the remaining link, comparing the confidence values of the links in the first link set with a preset threshold, and selecting a link whose confidence value is greater than the preset threshold, where the same links are at least two links in which two ports included in one link are the same as those in any other link.

With reference to the first possible implementation manner of the second aspect, in a third possible implementation manner, the uncertainty reasoning algorithm includes the following:

$$CF_{i,j}(H) = \begin{cases} CF_i(H) + CF_j(H) - CF_i(H) \times CF_j(H) & \text{if } CF_i(H) \geq 0, CF_j(H) \geq 0 \\ CF_{i,j}(H) = CF_i(H) + CF_j(H) + \\ CF_i(H) \times CF_j(H) & \text{if } CF_i(H) < 0, CF_j(H) < 0 \\ \dfrac{CF_i(H) + CF_j(H)}{1 - \min(|CF_i(H)|, |CF_j(H)|)} & \text{if } CF_i(H) \text{ and } CF_j(H) \\ & \text{have opposite signs} \end{cases}$$

where $CF_i(H)$ is a confidence value among multiple confidence values of the same links, $CF_j(H)$ is another confidence value among the multiple confidence values of the same links, and $CF_{i,j}(H)$ is a new confidence value of the same links that is calculated according to $CF_i(H)$ and $CF_j(H)$.

With reference to any possible implementation manner of the second aspect to the third possible implementation manner of the second aspect, in a fourth possible implementation manner, the network characteristic data and the corresponding topology discovery algorithm include at least two types of the following combinations: a port Internet Protocol (IP) address and an IP address matching algorithm, a port alias and a port alias matching algorithm, or port Link Layer Discovery Protocol (LLDP) neighbor information and a port LLDP link algorithm.

According to the network topology discovery method and device provided in the embodiments of the present application, first, network characteristic data of all network elements in a to-be-analyzed network is collected; next, at least two corresponding link subsets are obtained respectively by using at least two types of topology discovery algorithms and according to the network characteristic data, and all links in the at least two link subsets are gathered into one set to obtain a first link set; then, a second link set is obtained by performing an operation on the first link set, where the operation includes: combining same links, and for at least two links having only one same port, retaining a link having a largest confidence value in the at least two links and deleting a remaining link, where the same links are at least two links in which two ports included in one link are the same as those in any other link; and last, a network topology of the to-be-analyzed network is obtained according to each link in the second link set. In this way, a comprehensive analysis may be performed on results obtained after network topology discovery is performed by using multiple types of network characteristic data, so as to improve accuracy of network topology discovery.

BRIEF DESCRIPTION OF DRAWINGS

To describe the technical solutions in the embodiments of the present application more clearly, the following briefly describes the accompanying drawings required for describing the embodiments. Apparently, the accompanying drawings in the following description show some embodiments of the present application, and persons of ordinary skill in the art may still derive other drawings from these accompanying drawings without creative efforts.

DESCRIPTION OF EMBODIMENTS

To make the objectives, technical solutions, and advantages of the embodiments of the present application clearer, the following clearly describes the technical solutions in the embodiments of the present application with reference to the accompanying drawings in the embodiments of the present application. Apparently, the described embodiments are some but not all of the embodiments of the present application. All other embodiments obtained by persons of ordinary skill in the art based on the embodiments of the present application without creative efforts shall fall within the protection scope of the present application.

Figure 1:
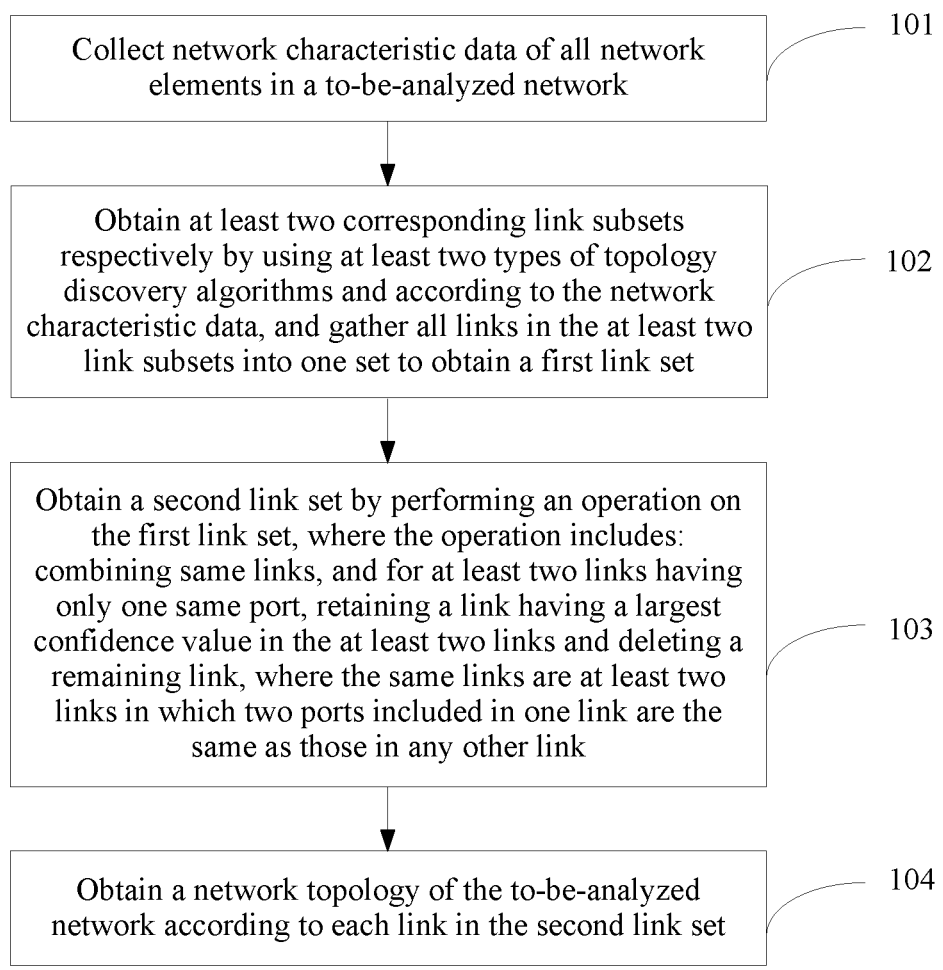
FIG. 1 is a schematic flowchart 1 of a network topology discovery method according to an embodiment of the present application.

An embodiment of the present application provides a network topology discovery method. As shown in FIG. 1, the method includes:

Step 101. Collect network characteristic data of all network elements in a to-be-analyzed network.

Step 102. Obtain at least two corresponding link subsets respectively by using at least two types of topology discovery algorithms and according to the network characteristic data, and gather all links in the at least two link subsets into one set to obtain a first link set.

A confidence value of a link in each link subset is equal to a confidence value of a topology discovery algorithm corresponding to each link subset, confidence values of different topology discovery algorithms are different, and the link is a link that consists of two ports of different network elements.

Step 103. Obtain a second link set by performing an operation on the first link set, where the operation includes: combining same links, and for at least two links having only one same port, retaining a link having a largest confidence value in the at least two links and deleting a remaining link, where the same links are at least two links in which two ports included in one link are the same as those in any other link.

Step 104. Obtain a network topology of the to-be-analyzed network according to each link in the second link set.

According to the network topology discovery method provided in this embodiment of the present application, first, network characteristic data of all network elements in a to-be-analyzed network is collected; next, at least two corresponding link subsets are obtained respectively by using at least two types of topology discovery algorithms and according to the network characteristic data, and all links in the at least two link subsets are gathered into one set to obtain a first link set; and a second link set is obtained by performing an operation on the first link set, where the operation includes: combining same links, and for at least two links having only one same port, retaining a link having a largest confidence value in the at least two links and deleting a remaining link, where the same links are at least two links in which two ports included in one link are the same as those in any other link; and last, a network topology of the to-be-analyzed network is obtained according to each link in the second link set. In this way, a comprehensive analysis may be performed on results obtained after network topology discovery is performed by using multiple types of network characteristic data, so as to improve accuracy of network topology discovery.

To make persons skilled in the art better understand the technical solution provided in this embodiment of the present application, the following describes in detail the network topology discovery method provided in this embodiment of the present application with reference to a specific embodiment.

Before the technical solution provided in this embodiment is described, some basic content in the technical solution is briefly described as follows:

In the technical solution provided in this embodiment, a network element is a network unit or node in a network system, and the unit is a device that can independently complete one or more functions. For example, in a GSM network system, a base station is a network element; an entity that can independently complete a function may become a network element, and therefore, a switch, a router or the like is also a network element; a link may be a physical link or a logical link.

A set that includes all network elements in a to-be-analyzed network is defined as $N=\{N_1, N_2, \ldots N_n\}$, and a set that includes all ports of all network elements is P, where the $j^{th}$ port of the $i^{th}$ network element $N_i$ is denoted as Pij, a range of i is [1, n], a range of j is [1, m], m is a quantity of ports corresponding to the network element $N_i$, and different network elements may have different values of m.

Network characteristic data of all network elements in the to-be-analyzed network may be collected by using a collection tool, and the network characteristic data is used as data input of a topology discovery algorithm. It is definite that the foregoing collecting network characteristic data of network elements by using a collection tool can be implemented by all persons of ordinary skills in the art. The network characteristic data includes at least two of the following: a port IP address, a port alias, port LLDP neighbor information, a network element name, port traffic, a Media Access Control (MAC) forwarding table, an Address Resolution Protocol (ARP) forwarding table, a routing and forwarding table, or virtual local area network (VLAN) configuration information.

To facilitate description of the technical solution provided in this embodiment of the present application, in the following embodiment, it is assumed that a quantity of network elements in the to-be-analyzed network is 5 (that is, n=5), a set that includes all network elements is N={N1, N2, N3, N4, N5}, a quantity of ports of each network element is 4 (that is, m=4), and a set that includes all physical ports of all the network elements is P={P11, P12, P13, P14, P21, P22, . . . , P51, P52, P53, P54}; network characteristic data to be selected for collection is a port IP address, a port alias, and port LLDP neighbor information; and correspondingly, topology discovery algorithms to be used are an IP address matching algorithm, a port alias algorithm, and a port LLDP link algorithm. It should be noted that such a selection manner is only exemplary, and is intended only to help describe the technical solution in this embodiment, and in actual application, persons skilled in the art may collect, according to an actual requirement, network characteristic data and select a corresponding topology algorithm.

Figure 2:
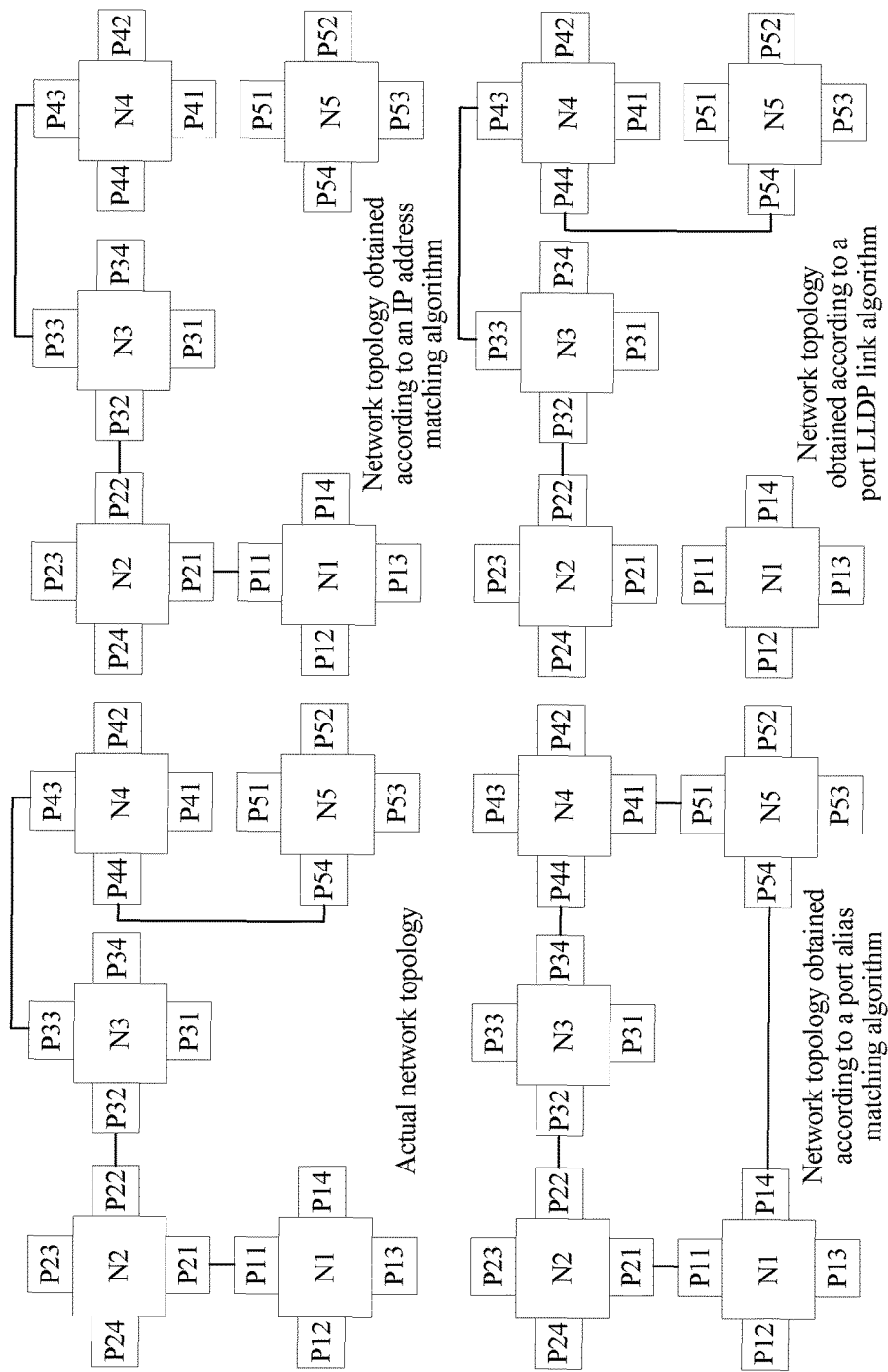
FIG. 2 is a schematic diagram of effects of a actual network topology and physical network topologies obtained by using three types of topology discovery algorithms according to an embodiment of the present application.

It is assumed that an actual network topology and network topologies obtained by means of calculation respectively by using the IP address matching algorithm, the port alias algorithm and the port LLDP link algorithm are shown in FIG. 2.

Figure 3:
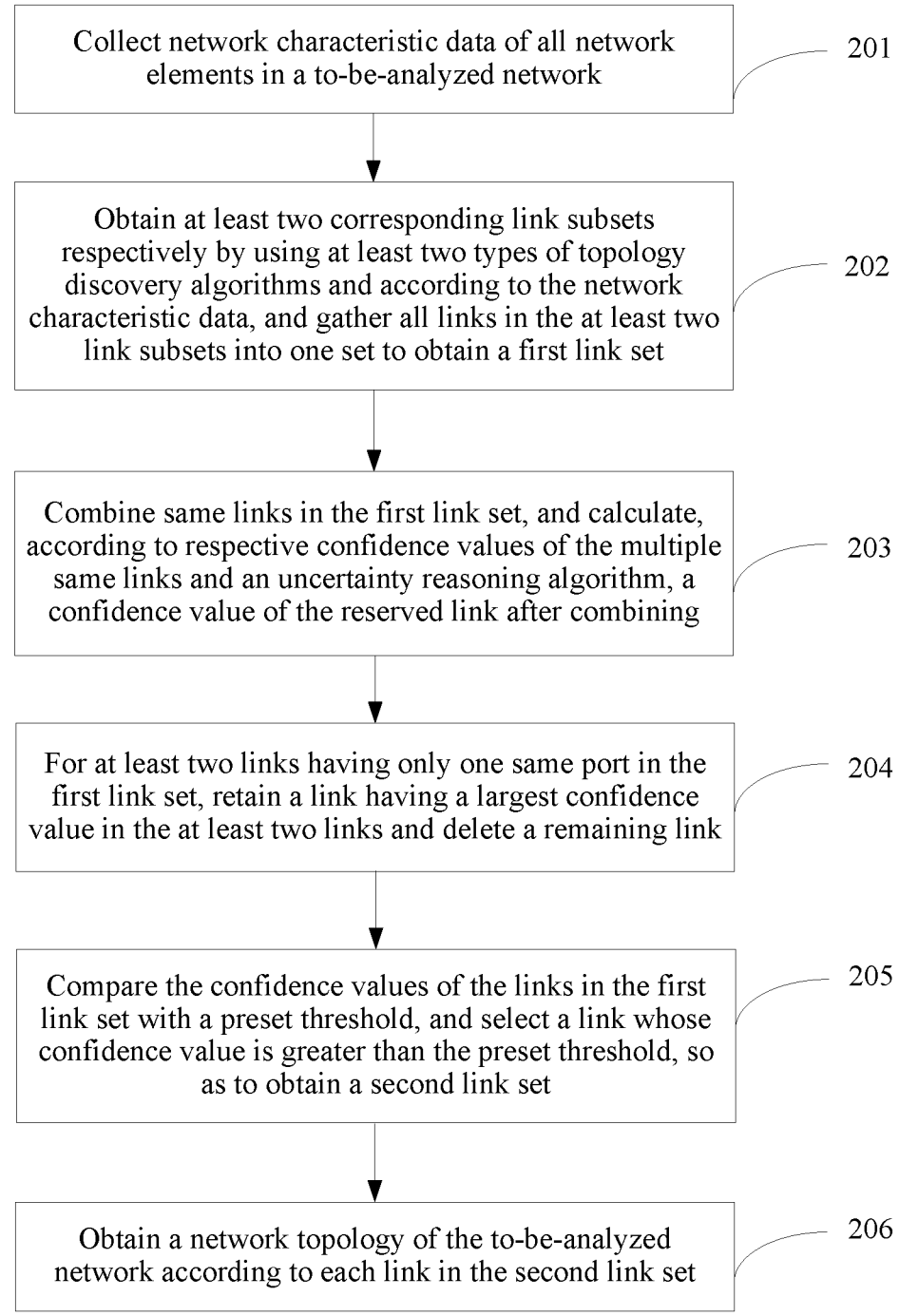
FIG. 3 is a schematic flowchart 2 of a network topology discovery method according to an embodiment of the present application.

FIG. 3 shows a network topology discovery method that is provided in this embodiment of the present application and that is based on the foregoing content. The method includes:

Step 201. Collect network characteristic data of all network elements in a to-be-analyzed network.

Exemplarily, a port IP address, a port alias, and port LLDP neighbor information that are of each of 20 ports of 5 network elements in the to-be-analyzed network are collected.

Step 202. Obtain at least two corresponding link subsets respectively by using at least two types of topology discovery algorithms and according to the network characteristic data, and gather all links in the at least two link subsets into one set to obtain a first link set.

A confidence value of a link in each link subset is equal to a confidence value of a topology discovery algorithm corresponding to each link subset, confidence values of different topology discovery algorithms are different, and the link is a link that consists of two ports of different network elements.

Exemplarily, the port IP addresses of the 20 ports are used as input of the IP address matching algorithm, a link subset L1 corresponding to the algorithm is obtained by means of calculation, and sequentially, a corresponding link subset L2 is obtained by means of calculation according to the port aliases and the port alias matching algorithm and a corresponding link subset L3 is obtained by means of calculation according to the port LLDP neighbor information and the port LLDP link algorithm. Links in the link subsets L1, L2, and L3 are gathered into one set to obtain a first link set that is, G=L1+L2+L3. There may be two cases for the links in the first link set G. Case 1: Two or more same links exist, where two same links mean that two ports included in one link are the same as those in the other link. Case 2: Two or more links having only one same port exist.

The link subset includes several links, for example, Li=Li1∪Li2∪ . . . ∪Lik, where Lik is the $k^{th}$ link obtained by means of calculation according to a corresponding algorithm i, k∈[1, K], and K is a quantity of links obtained by means of calculation according to the corresponding algorithm; the link Lik consists of two ports, Lik=(port 1, port 2), the port 1 and the port 2 are different ports, both the port 1 and the port 2 belong to the set P, and there is no sequence between the port 1 and the port 2 in one link Lik.

Different confidence values CFs are set according to different topology discovery algorithms (or corresponding network characteristic data), and a range of the confidence value CF may be set to [−1, 1]. In addition, confidence values of all links in a link set obtained by means of calculation according to one topology discovery algorithm are the same as a confidence value of the topology discovery algorithm (or corresponding network characteristic data).

To make persons skilled in the art better understand the foregoing content, refer to FIG. 2 and the following tables.

TABLE 1

| Algorithm | Algorithm name | Corresponding network characteristic data | Algorithm confidence value |
|---|---|---|---|
| 1 | IP address matching algorithm | Port IP address | 0.8 |
| 2 | Port alias matching algorithm | Port alias | 0.5 |
| 3 | LLDP link algorithm | Port LLDP neighbor information | 1.0 |

TABLE 2

| Algorithm | Algorithm name | Corresponding network characteristic data | Corresponding Algorithm confidence | Corresponding link subsets and confidence values corresponding to links |
|---|---|---|---|---|
| 1 | IP address matching algorithm | Port IP address | 0.8 | L11(P11, P21) = 0.8<br>L12(P22, P32) = 0.8<br>L13(P33, P43) = 0.8 |
| 2 | Port alias matching algorithm | Port alias | 0.5 | L21(P11, P21) = 0.5<br>L22(P22, P32) = 0.5<br>L23(P34, P44) = 0.5<br>L24(P41, P51) = 0.5<br>L25(P54, P14) = 0.5 |
| 3 | Port LLDP link algorithm | Port LLDP neighbor information | 1.0 | L31(P22, P32) = 1.0<br>L32(P33, P43) = 1.0<br>L33(P44, P54) = 1.0 |

TABLE 3

| Link set | Links and confidence values corresponding to the links |
|---|---|
| G | L11(P11, P21) = 0.8<br>L12(P22, P32) = 0.8<br>L13(P33, P43) = 0.8<br>L21(P11, P21) = 0.5<br>L22(P22, P32) = 0.5<br>L23(P34, P44) = 0.5<br>L24(P41, P51) = 0.5<br>L25(P54, P14) = 0.5<br>L31(P22, P32) = 1.0<br>L32(P33, P43) = 1.0<br>L33(P44, P54) = 1.0 |

Step 203. Combine same links in the first link set, and calculate, according to respective confidence values of the multiple same links and an uncertainty reasoning algorithm, a confidence value of the retained link after combining.

Exemplarily, for at least two same links existing in the first link set the multiple same links are combined, that is, only one same link in the first link set G is retained, and the confidence value of the retained link after combining is calculated according to respective confidence values of the multiple same links and the uncertainty reasoning algorithm. Refer to the following Table 4.

TABLE 4

| Link set | Links and confidence values corresponding to the links | Retained link after combining and a confidence value corresponding to the link |
|---|---|---|
| G | L11(P11, P21) = 0.8<br>L21(P11, P21) = 0.5<br>L12(P22, P32) = 0.8<br>L22(P22, P32) = 0.5<br>L31(P22, P32) = 1.0 | Retaining L11(P11, P21) = 0.9 after combining<br>Retaining L12(P22, P32) = 1.0 after combining |

TABLE 4-continued

| Link set | Links and confidence values corresponding to the links | Retained link after combining and a confidence value corresponding to the link |
|---|---|---|
| | L13(P33, P43) = 0.8 | Retaining L13(P33, P43) = 1.0 |
| | L32(P33, P43) = 1.0 | after combining |
| | L23(P34, P44) = 0.5 | L23(P34, P44) = 0.5 |
| | L24(P41, P51) = 0.5 | L24(P41, P51) = 0.5 |
| | L25(P54, P14) = 0.5 | L25(P54, P14) = 0.5 |
| | L33(P44, P54) = 1.0 | L33(P44, P54) = 1.0 |

The same links are at least two links in which two ports included in one link are the same as those in any other link, for example, L12, L22 and L31 in the foregoing Table 4. By using an example in which links L12, L22 and L31 are combined, the following describes how a confidence value of the retained L12 after combining is calculated according to the uncertainty reasoning algorithm.

The uncertainty reasoning algorithm in this embodiment of the present application is based on a confidence value, and the uncertainty reasoning algorithm includes the following:

$$CF_{i,j}(H) = \begin{cases} CF_i(H) + CF_j(H) - CF_i(H) \times CF_j(H) & \text{if } CF_i(H) \geq 0, CF_j(H) \geq 0 \\ CF_{i,j}(H) = CF_i(H) + CF_j(H) + CF_i(H) \times CF_j(H) & \text{if } CF_i(H) < 0, CF_j(H) < 0 \\ \dfrac{CF_i(H) + CF_j(H)}{1 - \min(|CF_i(H)|, |CF_j(H)|)} & \text{if } CF_i(H) \text{ and } CF_j(H) \text{ have opposite signs} \end{cases}$$

where $CF_i(H)$ is a confidence value among multiple confidence values of the same links, $CF_j(H)$ is another confidence value among the multiple confidence values of the same links, and $CF_{i,j}(H)$ is a new confidence value of the same links that is calculated according to $CF_i(H)$ and $CF_j(H)$.

The following describes, in detail, specific meaning of the foregoing formula:

when $CF_i(H) \geq 0$ and $CF_j(H) \geq 0$, the following formula is used:

$$CF_{i,j}(H) = CF_i(H) + CF_j(H) - CF_i(H) \times CF_j(H);$$

when $CF_i(H) < 0$ and $CF_j(H) < 0$, the following formula is used:

$$CF_{i,j}(H) = CF_i(H) + CF_j(H) + CF_i(H) \times CF_j(H);$$

when $CF_i(H)$ and $CF_j(H)$ have opposite signs, that is, $CF_i(H) \geq 0$ and $CF_j(H) < 0$, or $CF_j(H) \geq 0$ and $CF_i(H) < 0$, the following formula is used:

$$CF_{i,j}(H) = \frac{CF_i(H) + CF_j(H)}{1 - \min(|CF_i(H)|, |CF_j(H)|)}.$$

For same links that have two or more confidence values, when the confidence value of the retained link after combining is calculated, two confidence values are first selected as input of the foregoing formulas to obtain a new confidence value, and then the new confidence value and a confidence value that does not participate in the calculation are used as input of the foregoing formulas to obtain an updated confidence value. The foregoing steps are repeated until all confidence values of the links participate in the calculation of the formulas once, so as to finally obtain the confidence value of the retained link after combining.

For example, the confidence value of the retained link L12 after combining is calculated.

First, confidence values 0.8 and 0.5 of L12 and L22 are selected as input of the foregoing formulas, that is, 0.8+0.5−0.8×0.5=0.9; then, 0.9 and a confidence value 1.0 of L31 are used as input of the foregoing formulas, that is, 0.9+1.0−0.9×1.0=1.0; and finally, 1.0 is used as the confidence value of the retained link L12 after combining.

It should be noted that, a method for calculating a confidence value of a retained link after combining is not limited to the foregoing calculation formulas, and persons skilled in the art may further perform calculation by using another calculation method. For example, a weighted sum algorithm may be used. By using L12(P22, P32), L22(P22, P32), and L31(P22, P32) as an example, weighting coefficients of the confidence value of the IP address matching algorithm, of the confidence value of the port alias matching algorithm, and of the confidence value of the port LLDP link algorithm are respectively set to 0.2, 0.3, and 0.6, and the confidence value of the retained link L12 after combining is calculated: 0.8×0.2+0.5×0.3+1.0×0.6=0.91. A method for calculating a comprehensive confidence value of a link according to multiple confidence values of the same links is not limited in this embodiment of the present application, and persons of ordinary skill in the art may use the calculation method provided in this embodiment of the present application, or may use another calculation method.

Step 204. For at least two links having only one same port in the first link set, retain a link having a largest confidence value in the at least two links and delete a remaining link.

Exemplarily, refer to the following Table 5.

TABLE 5

| Link set | Links and confidence values corresponding to the links | Links and confidence values corresponding to the links |
|---|---|---|
| G | L11(P11, P21) = 0.9 | L11(P11, P21) = 0.9 |
| | L12(P22, P32) = 1.0 | L12(P22, P32) = 1.0 |
| | L13(P33, P43) = 1.0 | L13(P33, P43) = 1.0 |
| | L23(P34, P44) = 0.5 | L24(P41, P51) = 0.5 |
| | L24(P41, P51) = 0.5 | L33(P44, P54) = 1.0 |
| | L25(P54, P14) = 0.5 | |
| | L33(P44, P54) = 1.0 | |

Referring to the foregoing Table 5 in which L23 and L33 have only one same port P44 and L25 and L33 have only one same port P54, first, L33 is retained and L23 is deleted from L23 and L33, and then L33 is retained and L25 is deleted from L25 and L33; or first, L33 is retained and L25 is deleted from L25 and L33, and then L33 is retained and L23 is deleted from L23 and L33, where a sequence is not limited herein provided that selection is performed according to a principle of retaining a link having a largest confidence value among multiple links that have only one same port.

Step 205. Compare the confidence values of the links in the first link set with a preset threshold, and select a link whose confidence value is greater than the preset threshold, so as to obtain a second link set.

Exemplarily, the confidence values, of all links in the first link set, obtained according to step 203 and step 204 are compared with a preset threshold 0.7, and a link whose confidence value is greater than 0.7 is selected, so as to obtain a second link set G'. Refer to the following Table 6.

TABLE 6

| Link set | Links and confidence values corresponding to the links |
|---|---|
| G' | L11(P11, P21) = 0.9 |
|  | L12(P22, P32) = 1.0 |
|  | L13(P33, P43) = 1.0 |
|  | L33(P44, P54) = 1.0 |

Step 206. Obtain a network topology of the to-be-analyzed network according to each link in the second link set.

Exemplarily, the network topology of the to-be-analyzed network can be obtained according to all links L11(P11, P21), L12(P22, P32), L13(P33, P43), and L33(P44, P54) in the second link set G': the port P11 of the network element N1 is connected to the port 21 of the network element N2, the port P22 of the network element N2 is connected to the port P32 of the network element N3, the port P33 of the network element N3 is connected to the port P43 of the network element N4, and the port P44 of the network element N4 is connected to the port P54 of the network element N5. It can be seen that the network topology of the to-be-analyzed network that is obtained according to the technical solution provided in the foregoing embodiment is consistent with the network topology of the to-be-analyzed network shown in FIG. 2.

According to the network topology discovery method provided in this embodiment of the present application, first, network characteristic data of all network elements in a to-be-analyzed network is collected; next, at least two corresponding link subsets are obtained respectively by using at least two types of topology discovery algorithms and according to the network characteristic data, and all links in the at least two link subsets are gathered into one set to obtain a first link set; then, a second link set is obtained by performing an operation on the first link set, where the operation includes: combining same links, and for at least two links having only one same port, retaining a link having a largest confidence value in the at least two links and deleting a remaining link, where the same links are at least two links in which two ports included in one link are the same as those in any other link; and last, a network topology of the to-be-analyzed network is obtained according to each link in the second link set. In this way, a comprehensive analysis may be performed on results obtained after network topology discovery is performed by using multiple types of network characteristic data, so as to improve accuracy of network topology discovery.

Figure 4:
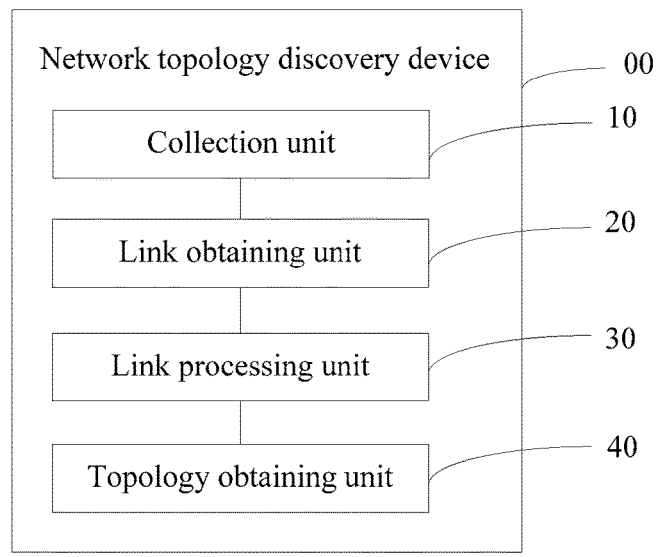
FIG. 4 is a schematic structural diagram 1 of a network topology discovery device according to an embodiment of the present application.

An embodiment of the present application provides a network topology discovery device 00. As shown in FIG. 4, the device 00 includes:

a collection unit 10, configured to collect network characteristic data of all network elements in a to-be-analyzed network;

a link obtaining unit 20, configured to obtain at least two corresponding link subsets respectively by using at least two types of topology discovery algorithms and according to the network characteristic data, and gather all links in the at least two link subsets into one set to obtain a first link set, where a confidence value of a link in each link subset is equal to a confidence value of a topology discovery algorithm corresponding to each link subset, confidence values of different topology discovery algorithms are different, and the link is a link that consists of two ports of different network elements;

a link processing unit 30, configured to obtain a second link set by performing an operation on the first link set, where the operation includes: combining same links, and for at least two links having only one same port, retaining a link having a largest confidence value in the at least two links and deleting a remaining link, where the same links are at least two links in which two ports included in one link are the same as those in any other link; and a topology obtaining unit 40, configured to obtain a network topology of the to-be-analyzed network according to each link in the second link set.

Optionally, the link processing unit 30 is specifically configured to:

obtain the second link set by performing an operation on the first link set, where the operation includes: combining same links in the first link set, calculating, according to multiple confidence values of the same links and an uncertainty reasoning algorithm, a confidence value of the retained link after combining, and for the at least two links having only one same port, retaining the link having the largest confidence value in the at least two links and deleting the remaining link, where the same links are at least two links in which two ports included in one link are the same as those in any other link.

Optionally, the link processing unit 30 may be further specifically configured to:

obtain the second link set by performing an operation on the first link set, where the operation includes: combining same links in the first link set, calculating, according to multiple confidence values of the same links and an uncertainty reasoning algorithm, a confidence value of the retained link after combining, and for the at least two links having only one same port, retaining the link having the largest confidence value in the at least two links, deleting the remaining link, comparing the confidence values of the links in the first link set with a preset threshold, and selecting a link whose confidence value is greater than the preset threshold, where the same links are at least two links in which two ports included in one link are the same as those in any other link.

Optionally, the uncertainty reasoning algorithm includes the following:

$$CF_{i,j}(H) = \begin{cases} CF_i(H) + CF_j(H) - CF_i(H) \times CF_j(H) & \text{if } CF_i(H) \geq 0, CF_j(H) \geq 0 \\ CF_{i,j}(H) = CF_i(H) + CF_j(H) + \\ CF_i(H) \times CF_j(H) & \text{if } CF_i(H) < 0, CF_j(H) < 0 \\ \dfrac{CF_i(H) + CF_j(H)}{1 - \min(|CF_i(H)|, |CF_j(H)|)} & \text{if } CF_i(H) \text{ and } CF_j(H) \\ & \text{have opposite signs} \end{cases}$$

where $CF_i(H)$ is a confidence value among multiple confidence values of the same links, $CF_j(H)$ is another confidence value among the multiple confidence values of the same links, and $CF_{i,j}(H)$ is a new confidence value of the same links that is calculated according to $CF_i(H)$ and $CF_j(H)$.

Optionally, the network characteristic data and the corresponding topology discovery algorithm include at least two types of the following combinations: a port Internet Protocol IP address and an Internet Protocol IP address matching algorithm, a port alias and a port alias matching algorithm, or port Link Layer Discovery Protocol LLDP neighbor information and a port Link Layer Discovery Protocol LLDP link algorithm.

This embodiment is used to implement the foregoing method embodiments; for working procedures and working principles of all units in this embodiment, reference may be made to descriptions in the foregoing method embodiments and details are not described herein.

According to the network topology discovery device provided in this embodiment of the present application, first, network characteristic data of all network elements in a to-be-analyzed network is collected; next, at least two corresponding link subsets are obtained respectively by using at least two types of topology discovery algorithms and according to the network characteristic data, and all links in the at least two link subsets are gathered into one set to obtain a first link set; then, a second link set is obtained by performing an operation on the first link set, where the operation includes: combining same links, and for at least two links having only one same port, retaining a link having a largest confidence value in the at least two links and deleting a remaining link, where the same links are at least two links in which two ports included in one link are the same as those in any other link; and last, a network topology of the to-be-analyzed network is obtained according to each link in the second link set. In this way, a comprehensive analysis may be performed on results obtained after network topology discovery is performed by using multiple types of network characteristic data, so as to improve accuracy of network topology discovery.

Figure 5:
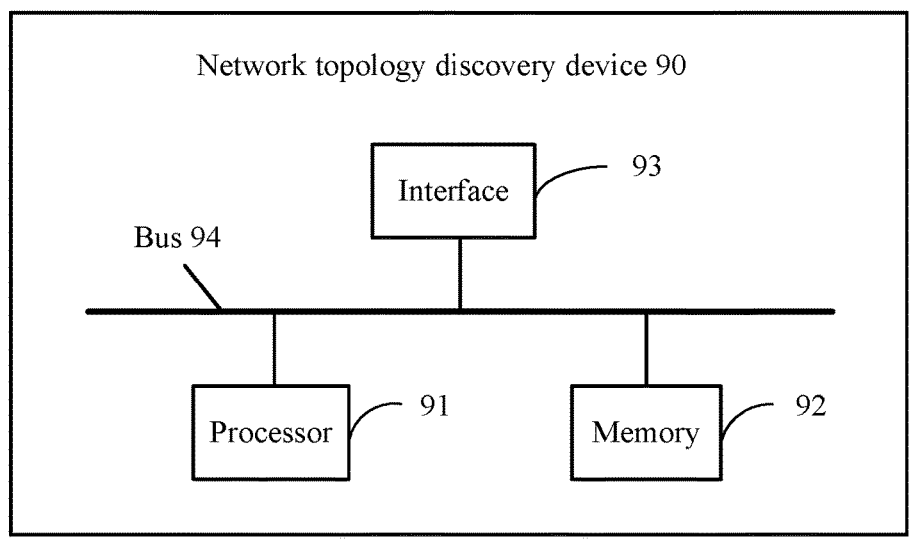
FIG. 5 is a schematic structural diagram 2 of a network topology discovery device according to an embodiment of the present application.

An embodiment of the present application further provides a network topology discovery device 90. As shown in FIG. 5, the device 90 includes: a bus 94 and a processor 91, a memory 92, and an interface 93 that are connected to the bus 94, where the interface 93 is configured to communicate, the memory 92 is configured to store an instruction, and the processor 91 is configured to execute the instruction to:

collect network characteristic data of all network elements in a to-be-analyzed network;

obtain at least two corresponding link subsets respectively by using at least two types of topology discovery algorithms and according to the network characteristic data, and gather all links in the at least two link subsets into one set to obtain a first link set, where a confidence value of a link in each link subset is equal to a confidence value of a topology discovery algorithm corresponding to the link subset, confidence values of different topology discovery algorithms are different, and the link is a link that consists of two ports of different network elements;

obtain a second link set by performing an operation on the first link set, where the operation includes: combining same links, and for at least two links having only one same port, retaining a link having a largest confidence value in the at least two links and deleting a remaining link, where the same links are at least two links in which two ports included in one link are the same as those in any other link; and obtain a network topology of the to-be-analyzed network according to each link in the second link set.

Optionally, that the processor 91 executes the instruction to combine same links may specifically include:

combining same links in the first link set, and calculating, according to multiple confidence values of the same links and an uncertainty reasoning algorithm, a confidence value of the retained link after combining.

Optionally, the processor 91 executes the instruction to obtain the second link set by performing the operation on the first link set, and the operation further includes: after retaining a link having a largest confidence value in the at least two links and deleting a remaining link, comparing the confidence values of the links in the first link set with a preset threshold, and selecting a link whose confidence value is greater than the preset threshold.

Optionally, the uncertainty reasoning algorithm includes the following:

$$CF_{i,j}(H) = \begin{cases} CF_i(H) + CF_j(H) - CF_i(H) \times CF_j(H) & \text{if } CF_i(H) \geq 0, CF_j(H) \geq 0 \\ CF_{i,j}(H) = CF_i(H) + CF_j(H) + \\ CF_i(H) \times CF_j(H) & \text{if } CF_i(H) < 0, CF_j(H) < 0 \\ \dfrac{CF_i(H) + CF_j(H)}{1 - \min(|CF_i(H)|, |CF_j(H)|)} & \text{if } CF_i(H) \text{ and } CF_j(H) \text{ have opposite signs} \end{cases}$$

where $CF_i(H)$ is a confidence value among multiple confidence values of the same links, $CF_j(H)$ is another confidence value among the multiple confidence values of the same links, and $CF_{i,j}(H)$ is a new confidence value of the same links that is calculated according to $CF_i(H)$ and $CF_j(H)$.

Optionally, the network characteristic data and the corresponding topology discovery algorithm include at least two types of the following combinations: a port Internet Protocol (IP) address and an IP address matching algorithm, a port alias and a port alias matching algorithm, or port Link Layer Discovery Protocol (LLDP) neighbor information and a port LLDP link algorithm.

This embodiment is used to implement the foregoing method embodiments; for working procedures and working principles of all units in this embodiment, reference may be made to descriptions in the foregoing method embodiments and details are not described herein.

According to the network topology discovery device provided in this embodiment of the present application, first, network characteristic data of all network elements in a to-be-analyzed network is collected; next, at least two corresponding link subsets are obtained respectively by using at least two types of topology discovery algorithms and according to the network characteristic data, and all links in the at least two link subsets are gathered into one set to obtain a first link set; then, a second link set is obtained by performing an operation on the first link set, where the operation includes: combining same links, and for at least two links having only one same port, retaining a link having a largest confidence value in the at least two links and deleting a remaining link, where the same links are at least two links in which two ports included in one link are the same as those in any other link; and last, a network topology of the to-be-analyzed network is obtained according to each link in the second link set. In this way, a comprehensive analysis may be performed on results obtained after network topology discovery is performed by using multiple types of network characteristic data, so as to improve accuracy of network topology discovery.

Persons of ordinary skill in the art may understand that all or some of the steps of the method embodiments may be implemented by a program instructing relevant hardware. The program may be stored in a computer-readable storage medium. When the program runs, the steps of the method embodiments are performed. The foregoing storage medium includes: any medium that can store program code, such as a ROM, a RAM, a magnetic disk, or an optical disc.

Finally, it should be noted that the foregoing embodiments are merely intended for describing the technical solutions of the present application, but not for limiting the present application. Although the present application is described in detail with reference to the foregoing embodiments, persons of ordinary skill in the art should understand that they may still make modifications to the technical solutions described in the foregoing embodiments or make equivalent replacements to some or all technical features thereof, without departing from the scope of the technical solutions of the embodiments of the present application.

What is claimed is:

1. A network topology discovery method, comprising:
    collecting network characteristic data of all network elements in a to-be-analyzed network;
    obtaining at least two corresponding link subsets respectively by using at least two types of topology discovery algorithms and according to the network characteristic data, and gathering all links in the at least two link subsets into one set to obtain a first link set, wherein a confidence value of a link in each link subset is equal to a confidence value of a topology discovery algorithm corresponding to the link subset, confidence values of different topology discovery algorithms are different, and the link is a link that consists of two ports of different network elements;
    obtaining a second link set by performing an operation on the first link set, wherein the operation comprises: combining same links, and for at least two links having only one same port, retaining a link having a largest confidence value in the at least two links and deleting a remaining link, wherein the same links are at least two links in which two ports in one link are the same as those in any other link; and
    obtaining a network topology of the to-be-analyzed network according to each link in the second link set.

2. The method according to claim 1, wherein the combining same links comprises:
    combining same links in the first link set, and calculating, according to multiple confidence values of the same links and an uncertainty reasoning algorithm, a confidence value of the retained link after combining.

3. The method according to claim 1, wherein the operation further comprises: after the retaining a link having a largest confidence value in the at least two links and deleting a remaining link,
    comparing the confidence values of the links in the first link set with a preset threshold, and selecting a link whose confidence value is greater than the preset threshold.

4. The method according to claim 2, wherein the operation further comprises: after the retaining a link having a largest confidence value in the at least two links and deleting a remaining link,
    comparing the confidence values of the links in the first link set with a preset threshold, and selecting a link whose confidence value is greater than the preset threshold.

5. The method according to claim 2, wherein the uncertainty reasoning algorithm comprises the following:

$$CF_{i,j}(H) = \begin{cases} CF_i(H) + CF_j(H) - CF_i(H) \times CF_j(H) & \text{if } CF_i(H) \geq 0, CF_j(H) \geq 0 \\ CF_{i,j}(H) = CF_i(H) + CF_j(H) + CF_i(H) \times CF_j(H) & \text{if } CF_i(H) < 0, CF_j(H) < 0 \\ \dfrac{CF_i(H) + CF_j(H)}{1 - \min(|CF_i(H)|, |CF_j(H)|)} & \text{if } CF_i(H) \text{ and } CF_j(H) \text{ have opposite signs} \end{cases}$$

wherein $CF_i(H)$ is a confidence value among multiple confidence values of the same links, $CF_j(H)$ is another confidence value among the multiple confidence values of the same links, and $CF_{i,j}(H)$ is a new confidence value of the same links that is calculated according to $CF_i(H)$ and $CF_j(H)$.

6. The method according to claim 1, wherein the network characteristic data and the corresponding topology discovery algorithm comprise at least two types of the following combinations: a port Internet Protocol (IP) address and an IP address matching algorithm, a port alias and a port alias matching algorithm, or port Link Layer Discovery Protocol (LLDP) neighbor information and a port LLDP link algorithm.

7. The method according to claim 2, wherein the network characteristic data and the corresponding topology discovery algorithm comprise at least two types of the following combinations: a port Internet Protocol (IP) address and an IP address matching algorithm, a port alias and a port alias matching algorithm, or port Link Layer Discovery Protocol (LLDP) neighbor information and a port LLDP link algorithm.

8. The method according to claim 3, wherein the network characteristic data and the corresponding topology discovery algorithm comprise at least two types of the following combinations: a port Internet Protocol (IP) address and an IP address matching algorithm, a port alias and a port alias matching algorithm, or port Link Layer Discovery Protocol (LLDP) neighbor information and a port LLDP link algorithm.

9. The method according to claim 4, wherein the network characteristic data and the corresponding topology discovery algorithm comprise at least two types of the following combinations: a port Internet Protocol (IP) address and an IP address matching algorithm, a port alias and a port alias matching algorithm, or port Link Layer Discovery Protocol (LLDP) neighbor information and a port LLDP link algorithm.

10. A network topology discovery device, comprising a memory and a processor communicating with the memory, where:
    the memory is configured to store instructions,
    the processor is configured to perform the instructions to perform:
    collecting network characteristic data of all network elements in a to-be-analyzed network,
    obtaining at least two corresponding link subsets respectively by using at least two types of topology discovery algorithms and according to the network characteristic data, and gather all links in the at least two link subsets into one set to obtain a first link set, wherein a confidence value of a link in each link subset is equal to a confidence value of a topology discovery algorithm corresponding to the link subset, confidence values of different topology discovery algorithms are different, and the link is a link that consists of two ports of different network elements;
    obtaining a second link set by performing an operation on the first link set, wherein the operation comprises: combining same links, and for at least two links having only one same port, retaining a link having a largest confidence value in the at least two links and deleting a remaining link, wherein the same links are at least two links in which two ports comprised in one link are the same as those in any other link; and
    obtaining a network topology of the to-be-analyzed network according to each link in the second link set.

11. The device according to claim 10, wherein the obtaining a second link set by performing an operation on the first link set, specially comprises:
   obtaining the second link set by performing an operation on the first link set, wherein the operation comprises: combining same links in the first link set, calculating, according to multiple confidence values of the same links and an uncertainty reasoning algorithm, a confidence value of the retained link after combining, and for the at least two links having only one same port, retaining the link having the largest confidence value in the at least two links and deleting the remaining link, wherein the same links are at least two links in which two ports comprised in one link are the same as those in any other link.

12. The device according to claim 10, wherein the obtaining a second link set by performing an operation on the first link set, specifically comprises:
   obtaining the second link set by performing an operation on the first link set, wherein the operation comprises: combining same links in the first link set, calculating, according to multiple confidence values of the same links and an uncertainty reasoning algorithm, a confidence value of the retained link after combining, and for the at least two links having only one same port, retaining the link having the largest confidence value in the at least two links, deleting the remaining link, comparing the confidence values of the links in the first link set with a preset threshold, and selecting a link whose confidence value is greater than the preset threshold, wherein the same links are at least two links in which two ports comprised in one link are the same as those in any other link.

13. The device according to claim 11, wherein the uncertainty reasoning algorithm comprises the following:

$$CF_{i,j}(H) = \begin{cases} CF_i(H) + CF_j(H) - CF_i(H) \times CF_j(H) & \text{if } CF_i(H) \geq 0, CF_j(H) \geq 0 \\ CF_{i,j}(H) = CF_i(H) + CF_j(H) + CF_i(H) \times CF_j(H) & \text{if } CF_i(H) < 0, CF_j(H) < 0 \\ \dfrac{CF_i(H) + CF_j(H)}{1 - \min(|CF_i(H)|, |CF_j(H)|)} & \text{if } CF_i(H) \text{ and } CF_j(H) \text{ have opposite signs} \end{cases}$$

wherein $CF_i(H)$ is a confidence value among multiple confidence values of the same links, $CF_j(H)$ is another confidence value among the multiple confidence values of the same links, and $CF_{i,j}(H)$ is a new confidence value of the same links that is calculated according to $CF_i(H)$ and $CF_j(H)$.

14. The device according to claim 10, wherein the network characteristic data and the corresponding topology discovery algorithm comprise at least two types of the following combinations: a port Internet Protocol (IP) address and an IP address matching algorithm, a port alias and a port alias matching algorithm, or port Link Layer Discovery Protocol (LLDP) neighbor information and a port LLDP link algorithm.

15. A non-transitory computer-readable storage medium comprising instructions which, when executed by a computer, cause the computer to carry out steps of:
   collecting network characteristic data of all network elements in a to-be-analyzed network,
   obtaining at least two corresponding link subsets respectively by using at least two types of topology discovery algorithms and according to the network characteristic data, and gather all links in the at least two link subsets into one set to obtain a first link set, wherein a confidence value of a link in each link subset is equal to a confidence value of a topology discovery algorithm corresponding to the link subset, confidence values of different topology discovery algorithms are different, and the link is a link that consists of two ports of different network elements;
   obtaining a second link set by performing an operation on the first link set, wherein the operation comprises: combining same links, and for at least two links having only one same port, retaining a link having a largest confidence value in the at least two links and deleting a remaining link, wherein the same links are at least two links in which two ports comprised in one link are the same as those in any other link; and
   obtaining a network topology of the to-be-analyzed network according to each link in the second link set.

16. The non-transitory computer-readable storage medium according to claim 15, wherein the obtaining a second link set by performing an operation on the first link set, specially comprises:
   obtaining the second link set by performing an operation on the first link set, wherein the operation comprises: combining same links in the first link set, calculating, according to multiple confidence values of the same links and an uncertainty reasoning algorithm, a confidence value of the retained link after combining, and for the at least two links having only one same port, retaining the link having the largest confidence value in the at least two links and deleting the remaining link, wherein the same links are at least two links in which two ports comprised in one link are the same as those in any other link.

17. The non-transitory computer-readable storage medium according to claim 15, wherein the obtaining a second link set by performing an operation on the first link set, specifically comprises:
   obtaining the second link set by performing an operation on the first link set, wherein the operation comprises: combining same links in the first link set, calculating, according to multiple confidence values of the same links and an uncertainty reasoning algorithm, a confidence value of the retained link after combining, and for the at least two links having only one same port, retaining the link having the largest confidence value in the at least two links, deleting the remaining link, comparing the confidence values of the links in the first link set with a preset threshold, and selecting a link whose confidence value is greater than the preset threshold, wherein the same links are at least two links in which two ports comprised in one link are the same as those in any other link.

* * * * *